US012695345B2

(12) United States Patent
Gnabah et al.

(10) Patent No.: US 12,695,345 B2
(45) Date of Patent: Jul. 28, 2026

(54) DRIVE UNIT HAVING A FLUID FLOW PATH

(71) Applicant: Schaeffler Technologies AG & Co. KG, Herzogenaurach (DE)

(72) Inventors: Zachary Gnabah, Massillon, OH (US); Andrew Derhammer, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 493 days.

(21) Appl. No.: 18/347,162

(22) Filed: Jul. 5, 2023

(65) Prior Publication Data

US 2025/0015655 A1 Jan. 9, 2025

(51) Int. Cl.
*H02K 1/32* (2006.01)
*H02K 1/12* (2006.01)
*H02K 7/00* (2006.01)

(52) U.S. Cl.
CPC .................. *H02K 1/32* (2013.01); *H02K 1/12* (2013.01); *H02K 7/003* (2013.01); *H02K 2201/15* (2013.01)

(58) Field of Classification Search
CPC ............ H02K 1/32; H02K 1/12; H02K 7/003; H02K 2201/15; H02K 1/20; H02K 9/19; H02K 9/197
USPC ......................................................... 310/61
See application file for complete search history.

(56) References Cited

U.S. PATENT DOCUMENTS

| | | | |
|---|---|---|---|
| 6,949,857 B2 | 9/2005 | Neet et al. | |
| 2005/0062359 A1* | 3/2005 | Neet ...................... | H02K 3/493 |
| | | | 310/214 |
| 2020/0235620 A1* | 7/2020 | Matsumoto .............. | H02K 1/32 |

FOREIGN PATENT DOCUMENTS

CN 114567102 * 5/2022 ............. H02K 1/276

OTHER PUBLICATIONS

"Kia EV6GT: The High-performance Motor System That Achieves 260km/h," https://www.hyundaimotorgroup.com/story/CONT0000000000084233, accessed May 17, 2023, 19 pages.
"Power Performance with 2-Stage Inverter and Enhanced Cooling System EV6 GT—Kia," https://www.youtube.com/watch?v=nvFR0Oeellg, accessed May 17, 2023, 1 page.

* cited by examiner

*Primary Examiner* — Ahmed Elnakib
(74) *Attorney, Agent, or Firm* — Price Heneveld LLP

(57) ABSTRACT
A drive unit includes a stator assembly with a stator assembly core having a plurality of teeth that extend from a first end to a second end of the stator assembly core. The teeth have first, second, and third axial extents. The radially inboardmost portions of the first and second axial extents are radially inboard of the radially inboardmost portions of the third axial extent. The drive unit also includes a rotor assembly with first and second rotor bodies, a rotor mid plate, first and second rotor end plates, and a rotor shaft. The rotor assembly defines a portion of a fluid flow path of the drive unit including an interior hollow defined by the rotor shaft and a fluid passage defined by the rotor mid plate. Fluid is conveyed along the portion of the fluid flow path from the interior hollow to the fluid passage to the third axial extent.

17 Claims, 7 Drawing Sheets

DRIVE UNIT HAVING A FLUID FLOW PATH

FIELD OF THE DISCLOSURE

The present disclosure generally relates to a drive unit that includes a stator assembly and a rotor assembly. More specifically, the present disclosure relates to a drive unit that includes a rotor assembly that defines a fluid flow path for conveying fluid through the rotor assembly to a portion of the stator assembly.

BACKGROUND OF THE DISCLOSURE

Electric drive units generally define fluid circuits for fluid, such as oil, that lubricates and cools various components within the electric drive units. Fluid flow paths that allow for improved stator assembly cooling may be desired.

SUMMARY OF THE DISCLOSURE

According to a first aspect of the present disclosure, a drive unit includes a stator assembly and a rotor assembly. The stator assembly includes a stator assembly core having a plurality of teeth that extend axially from a first end of the stator assembly core to a second end of the stator assembly core opposite the first end. The plurality of teeth have a first axial extent that extends toward the second end from the first end, a second axial extent that extends toward the first end from the second end, and a third axial extent that is positioned axially between the first and second axial extents. The radially inboardmost portions of the first and second axial extents of the plurality of teeth are positioned radially inboard of the radially inboardmost portions of the third axial extent of the plurality of teeth. The rotor assembly is positioned radially inboard of the stator assembly and includes a first rotor body, a second rotor body, a rotor mid plate positioned axially between the first and second rotor bodies and axially aligned with the third axial extent of the plurality of teeth, a first rotor end plate positioned at an axial end of the first rotor body, such that the first rotor body is positioned axially between the first rotor end plate and the rotor mid plate, a second rotor end plate positioned at an axial end of the second rotor body, such that the second rotor body is positioned axially between the second rotor end plate and the rotor mid plate, and a rotor shaft positioned radially inboard of the first and second rotor bodies. The rotor assembly defines a portion of a fluid flow path of the drive unit, and the portion of the fluid flow path includes an interior hollow defined by the rotor shaft and a fluid passage defined by the rotor mid plate. In operation of the drive unit, fluid is conveyed along the portion of the fluid flow path from the interior hollow to the fluid passage and radially outboard therefrom to the third axial extent of the plurality of teeth of the stator assembly core.

Embodiments of the first aspect of the disclosure can include any one or a combination of the following features:
the plurality of teeth flare outward proximate to the radially inboardmost portions of the teeth along the first and second axial extents more so than along the third axial extent, such that the plurality of teeth are generally T-shaped along the first and second axial extents;
the rotor mid plate is substantially identical in shape to the first rotor end plate and the second rotor end plate;
the first rotor body includes an inner surface that faces the rotor shaft and an outer surface that is opposite the inner surface and that defines a channel that extends axially from a first channel end that is proximate to the rotor mid plate to a second channel end that is proximate to the first rotor end plate and circumferentially offset from the first channel end;
in operation of the drive unit, fluid is sequentially conveyed along the portion of the fluid flow path from the interior hollow to the first rotor end plate, to the first rotor body, to the fluid passage of the rotor mid plate, and radially outboard therefrom to the third axial extent of the plurality of teeth of the stator assembly core;
the rotor shaft defines a rotor shaft port, and the first rotor end plate defines a fluid inlet channel that is aligned with the rotor shaft port, and wherein, in operation of the drive unit, fluid is conveyed out of the interior hollow defined by the rotor shaft, through the rotor shaft port, and into the fluid inlet channel;
the first rotor body defines a first rotor body fluid passage that is aligned with the fluid inlet channel and that extends axially through the first rotor body to the rotor mid plate, and wherein, in operation of the drive unit, fluid is conveyed from the fluid inlet channel into the first rotor body fluid passage toward the rotor mid plate; and
the rotor mid plate defines an aperture that is in fluid communication with the fluid passage defined by the rotor mid plate, and wherein, in operation of the drive unit, fluid is conveyed from the first rotor body fluid passage to the aperture, along the fluid passage defined by the rotor mid plate, and radially outboard therefrom to the stator assembly.

According to a second aspect of the present disclosure, a drive unit includes a stator assembly and a rotor assembly positioned radially inboard of the stator assembly. The rotor assembly includes a first rotor body, a second rotor body, a rotor mid plate positioned axially between the first and second rotor bodies, a first rotor end plate positioned at an axial end of the first rotor body, such that the first rotor body is positioned axially between the first rotor end plate and the rotor mid plate, a second rotor end plate positioned at an axial end of the second rotor body, such that the second rotor body is positioned axially between the second rotor end plate and the rotor mid plate, and a rotor shaft positioned radially inboard of the first and second rotor bodies. The rotor assembly defines a portion of a fluid flow path of the drive unit, and the portion of the fluid flow path includes an interior hollow defined by the rotor shaft and a fluid passage defined by the rotor mid plate. In operation of the drive unit, fluid is conveyed along the portion of the fluid flow path from the interior hollow to the fluid passage and radially outboard therefrom to a portion of the stator assembly positioned axially between the first and second rotor end plates.

Embodiments of the second aspect of the disclosure can include any one or a combination of the following features:
the rotor mid plate is substantially identical in shape to the first rotor end plate and the second rotor end plate;
the rotor mid plate is positioned a first axial distance from the first rotor end plate and a second axial distance from the second rotor end plate that is substantially equal to the first axial distance;
the stator assembly includes a stator assembly core having a plurality of teeth that extend axially from a first end of the stator assembly core to a second end of the stator assembly core opposite the first end, the plurality of teeth having a first axial extent that extends toward the second end from the first end, a second axial extent that extends toward the first end from the second end, and a third axial extent that is positioned axially between the first and second axial extents, wherein the radially inboardmost portions of the first and second axial extents of the plurality of teeth are positioned radially inboard of the radially inboardmost portions of the third axial extent of the plurality of teeth, and wherein the third axial extent is axially aligned with the rotor mid plate of the rotor assembly;

the plurality of teeth flare outward proximate to the inboardmost portions of the teeth along the first and second axial extents more so than along the third axial extent, such that the plurality of teeth are generally T-shaped along the first and second axial extents;

in operation of the drive unit, fluid is sequentially conveyed along the portion of the fluid flow path from the interior hollow, to the first rotor end plate, to the first rotor body, to the fluid passage of the rotor mid plate, and radially outboard therefrom to the portion of the stator assembly positioned axially between the first and second rotor end plates;

the rotor shaft defines a rotor shaft port, and the first rotor end plate defines a fluid inlet channel that is aligned with the rotor shaft port, and wherein, in operation of the drive unit, fluid is conveyed out of the interior hollow defined by the rotor shaft, through the rotor shaft port, and into the fluid inlet channel;

the first rotor body defines a first rotor body fluid passage that is aligned with the fluid inlet channel and that extends axially through the first rotor body to the rotor mid plate, and wherein, in operation of the drive unit, fluid is conveyed from the fluid inlet channel into the first rotor body fluid passage toward the rotor mid plate; and the rotor mid plate defines an aperture that is in fluid communication with the fluid passage defined by the rotor mid plate, and wherein, in operation of the drive unit, fluid is conveyed from the first rotor body fluid passage to the aperture, along the fluid passage defined by the rotor mid plate, and radially outboard therefrom to the stator assembly.

According to a third aspect of the present disclosure, a stator assembly for a motor includes a stator assembly core having a plurality of teeth that extend axially from a first end of the stator assembly core to a second end of the stator assembly core opposite the first end. The plurality of teeth have a first axial extent that extends toward the second end from the first end, a second axial extent that extends toward the first end from the second end, and a third axial extent that is positioned axially between the first and second axial extents. The radially inboardmost portions of the first and second axial extents of the plurality of teeth are positioned radially inboard of the radially inboardmost portions of the third axial extent of the plurality of teeth.

Embodiments of the third aspect of the disclosure can include any one or a combination of the following features:

the plurality of teeth flare outward proximate to the radially inboardmost portions of the teeth along the first and second axial extents more so than along the third axial extent, such that the plurality of teeth are generally T-shaped along the first and second axial extents; and the plurality of teeth do not flare outward at the inboardmost portions of the plurality of teeth along the third axial extent of the plurality of teeth.

These and other features, advantages, and objects of the present disclosure will be further understood and appreciated by those skilled in the art by reference to the following specification, claims, and appended drawings.

Figure 1:
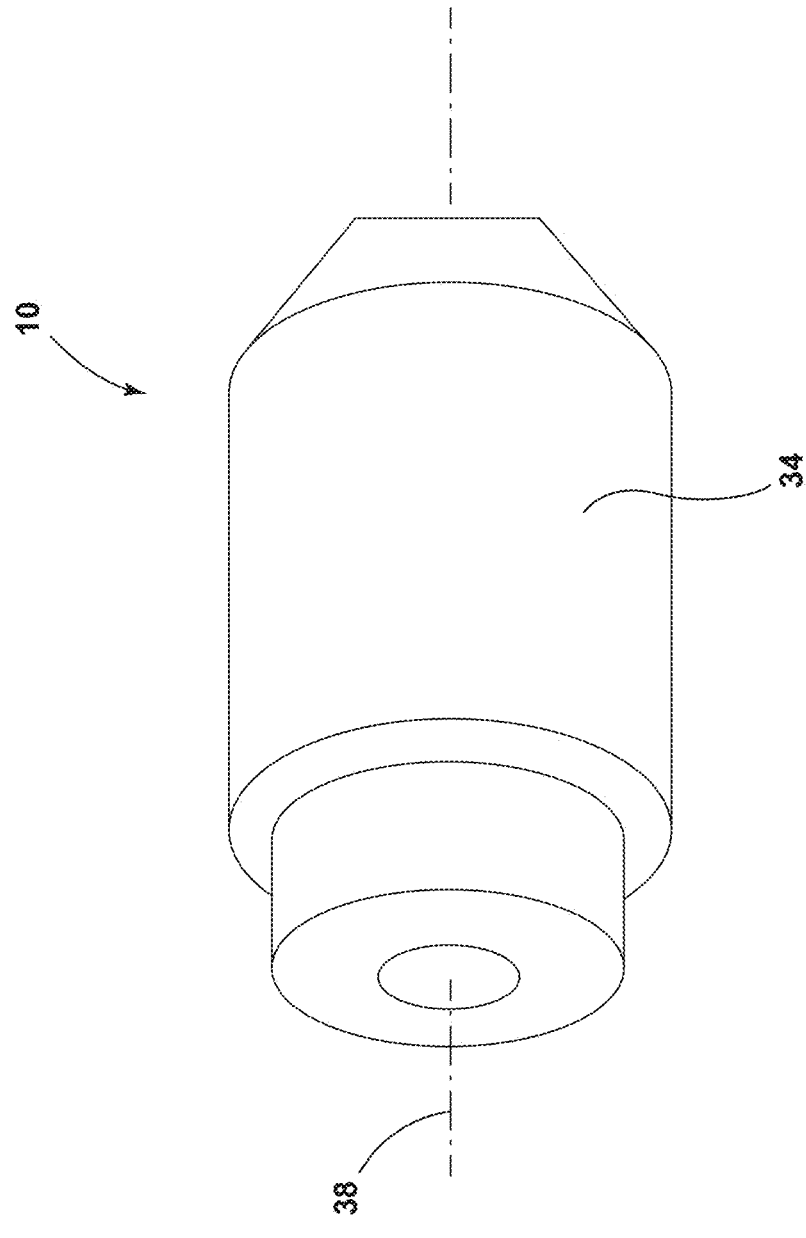
FIG. 1 is a top perspective view of a drive unit that includes a housing.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a rotor shaft configured to rotate in operation of the apparatus described herein. Further, the term "radial" and derivatives thereof, such as "radially," shall be understood in relation to the axis of the aforementioned rotor shaft. For example, "radially outboard" refers to further away from the axis, while "radially inboard" refers to nearer to the axis. The term "circumferential" and derivatives thereof, such as "circumferentially," shall be understood in relation to the axis of the aforementioned rotor shaft.

Referring now to FIGS. 1-8, and drive unit 10 includes a stator assembly 12 and a rotor assembly 14. The rotor assembly 14 is positioned radially inboard of the stator assembly 12. The rotor assembly 14 includes a first rotor body 16, a second rotor body 18, a rotor mid plate 20, a first rotor end plate 22, a second rotor end plate 24, and a rotor shaft 26. The rotor mid plate 20 is positioned axially between the first and second rotor bodies 16, 18. The first rotor end plate 22 is positioned at an axial end of the first rotor body 16, such that the first rotor body 16 is positioned axially between the first rotor end plate 22 and the rotor mid plate 20. The second rotor end plate 24 is positioned at an axial end of the second rotor body 18, such that the second rotor body 18 is positioned axially between the second rotor end plate 24 and the rotor mid plate 20. The rotor shaft 26 is positioned radially inboard of the first and second rotor bodies 16, 18. The rotor assembly 14 defines a portion of a fluid flow path 28 of the drive unit 10. The portion of the fluid flow path 28 includes an interior hollow 30 that is defined by the rotor shaft 26 and a fluid passage 32 that is defined by the rotor mid plate 20. In operation of the drive unit 10, fluid is conveyed along the portion of the fluid flow path 28 from the interior hollow 30 to the fluid passage 32 and radially outboard therefrom to a portion of the stator assembly 12 that is positioned axially between the first and second rotor end plates 22, 24.

Figure 2:
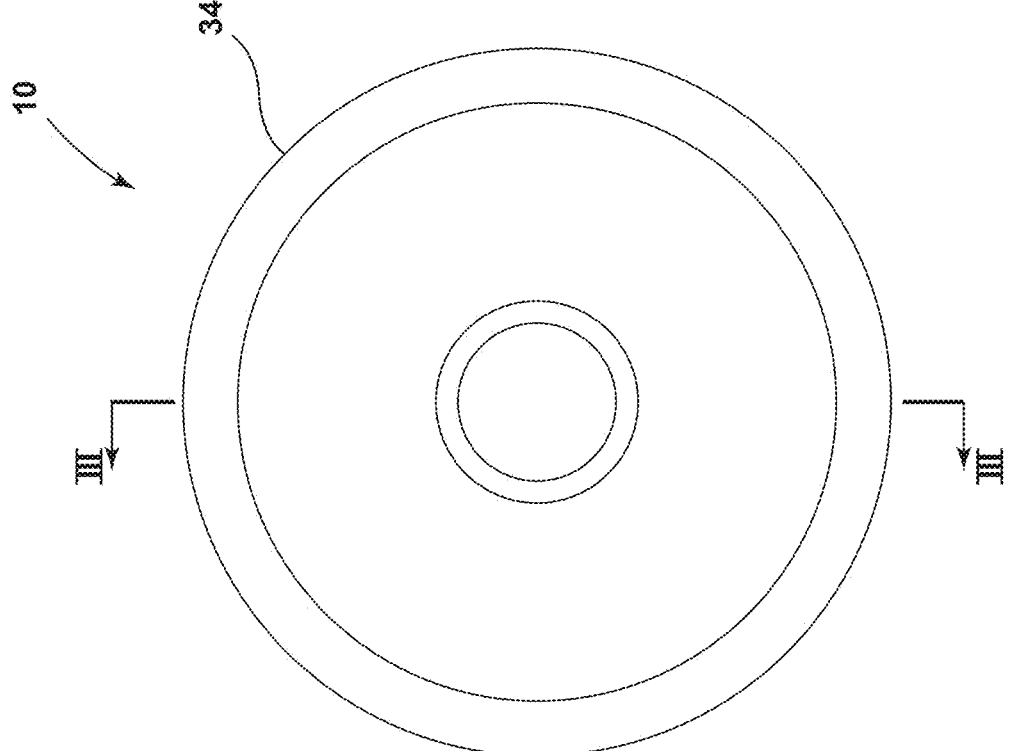
FIG. 2 is a side elevational view of the drive unit.
Figure 3:
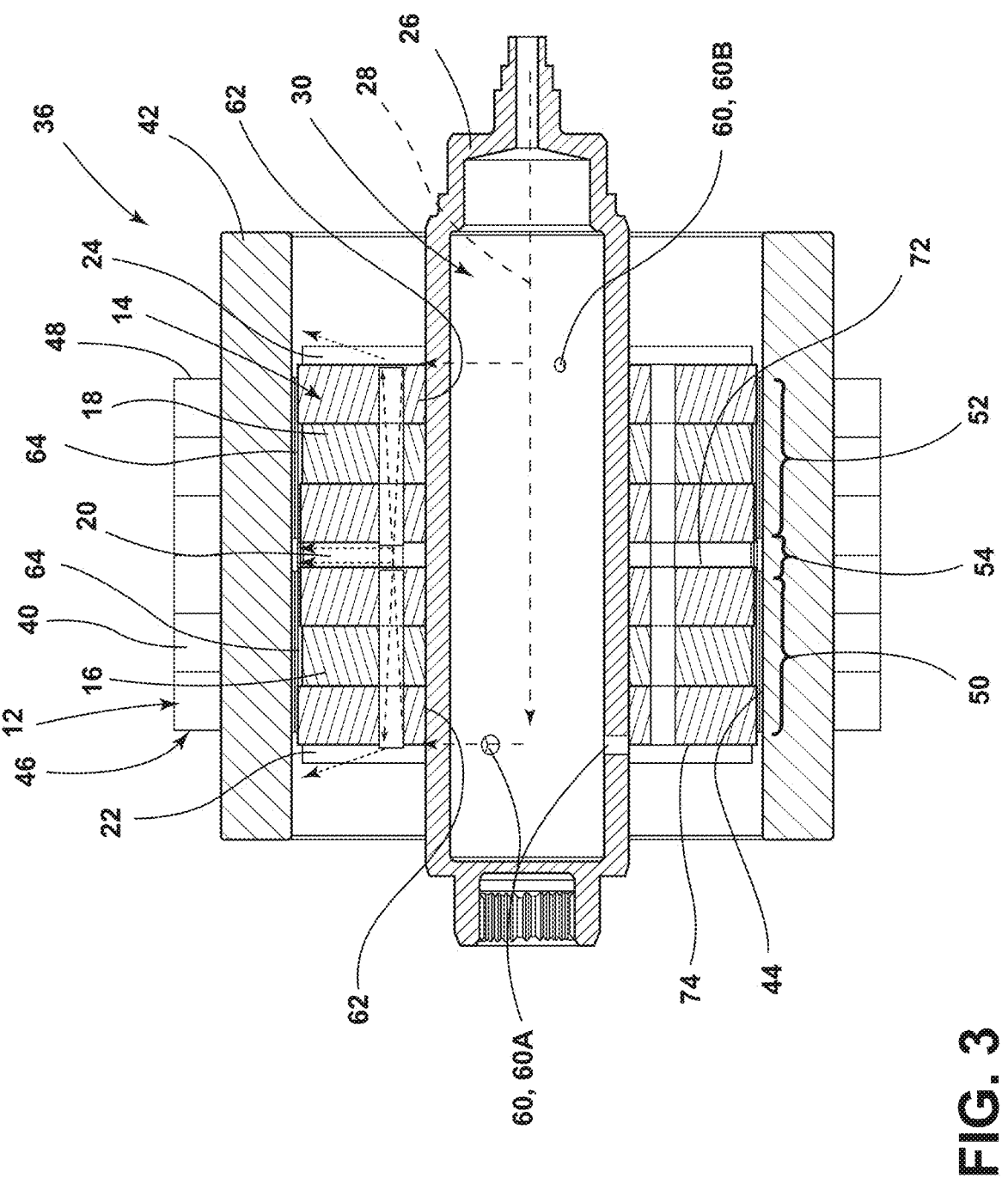
FIG. 3 is a cross-sectional view of the drive unit taken at line III-III in FIG. 2 with the housing omitted, illustrating a motor of the drive unit that includes a stator assembly and a rotor assembly.

Referring now to FIGS. 1-3, the drive unit 10 can be an electric drive unit 10. For example, as illustrated FIG. 3, the drive unit 10 can include an electric motor 36, as described further herein. The drive unit 10 includes a housing 34. The housing 34 can be an assembly of a plurality of components, in some examples. For example, the housing 34 may be a die-cast aluminum housing 34 that is formed of a plurality of components. The housing 34 may define a plurality of regions, such as a motor housing region and/or a gearbox region. The motor housing region may house the motor 36 of the drive unit 10, and the gearbox region may house a plurality of components of the drive unit 10, such as a gearset, and/or a differential. Further, the gearbox region (not shown) may serve as a reservoir for fluid that is utilized in the electric drive unit 10 and that is conveyed along the fluid flow path 28 of the drive unit 10, as described further herein.

Referring now to FIG. 3, the drive unit 10 includes the motor 36. The motor 36 includes the stator assembly 12 and the rotor assembly 14. The motor 36 is configured to drive rotation of the rotor shaft 26 of the rotor assembly 14 that is positioned radially inboard of the stator assembly 12 about an axis 38. In various embodiments, rotation of the rotor shaft 26 is configured to drive first and second output shafts (not shown) that can be operably coupled to the rotor shaft 26 via the gearset and the differential (not shown) disposed in the gearbox region of the housing 34. The drive unit 10 may be utilized in a vehicle, such as an electric vehicle or a hybrid electric vehicle, and the first and second output shafts may be operably coupled with the wheels of a vehicle, such that the drive unit 10 is a portion of an E-axle of the motor vehicle.

Figure 4:
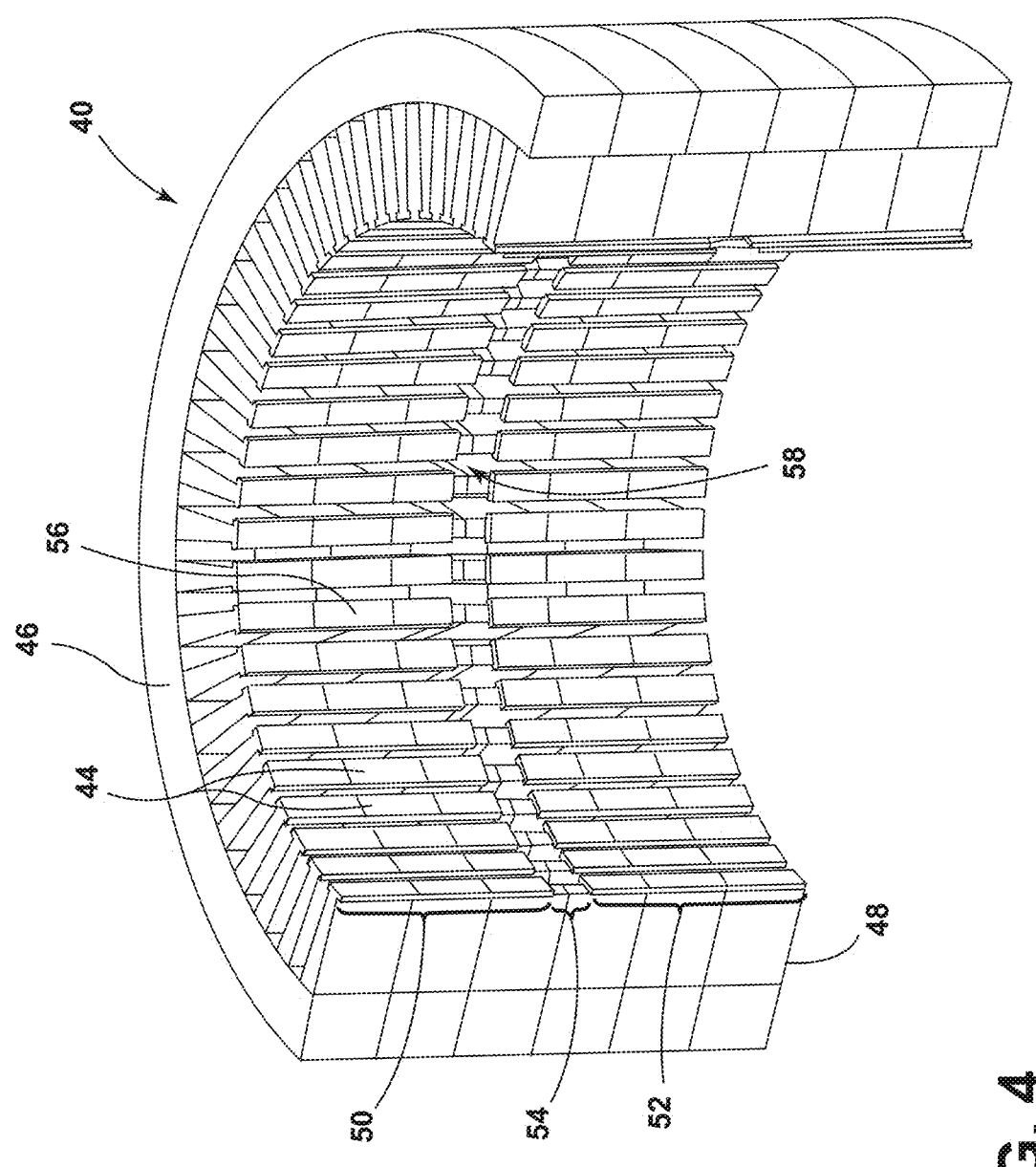
FIG. 4 is a perspective view of a stator assembly core of the cross section of the stator assembly illustrated in FIG. 3.

Referring now to FIGS. 3 and 4, the stator assembly 12 of the electric drive unit 10 includes a stator assembly core 40 and windings 42. As illustrated in FIG. 4, the stator assembly core 40 can include a plurality of teeth 44. The plurality of teeth 44 extend axially from a first end 46 of the stator assembly core 40 to a second end 48 of the stator assembly core 40 that is opposite the first end 46. The plurality of teeth 44 of the stator assembly core 40 may include a first axial extent 50, a second axial extent 52, and third axial extent 54. In other words, the axial distance that the plurality of teeth 44 extend between the first end 46 of the stator assembly core 40 and the second end 48 of the stator assembly core 40 may be divided into first, second, and third axial extents 50, 52, 54. As illustrated in FIG. 4, the first axial extent 50 of the plurality of teeth 44 extends toward the second end 48 of the stator assembly core 40 from the first end 46 of the stator assembly core 40. The second axial extent 52 of the plurality of teeth 44 extends toward the first end 46 from the second end 48 of the stator assembly core 40. The third axial extent 54 of the plurality of teeth 44 is positioned axially between the first and second axial extents 50, 52 of the plurality of teeth 44.

The plurality of teeth 44 extend radially inboard to terminal ends 56 of the plurality of teeth 44. In some implementations, the radially inboardmost portions of the first and second axial extents 50, 52 of the plurality of teeth 44 are positioned radially inboard of the radially inboardmost portions of the third axial extent 54 of the plurality of teeth 44. For example, as illustrated in FIG. 4, the portions of the teeth 44 that form the first and second axial extents 50, 52 of the teeth 44 extend radially inboard further than the portions of the teeth 44 that form the third axial extent 54 of the plurality of teeth 44. As such, the third axial extent 54 of the plurality of teeth 44 is generally recessed in the radially outboard direction relative to the interior surface of the teeth 44 along the first and second axial extents 50, 52.

Referring still to FIGS. 3 and 4, in some implementations, the plurality of teeth 44 flare outward proximate to the inboardmost portions of the teeth 44. The plurality of teeth 44 may flare outward proximate to the inboardmost portions of the teeth 44 along the first and second axial extents 50, 52 more so than along the third axial extent 54, such that the plurality of teeth 44 are generally T-shaped along the first and second axial extents 50, 52 of the plurality of teeth 44. In various implementations, the teeth 44 flare substantially circumferentially outward proximate to the radially inboardmost portions of the teeth 44 along the first and second axial extents 50, 52 of the plurality of teeth 44. In the embodiment illustrated in FIG. 4, the plurality of teeth 44 do not flare outward at the inboardmost portions of the plurality of teeth 44 along the third axial extent 54 of the plurality of teeth 44. As such, the circumferential distance between the radially inboardmost portions of adjacent teeth 44 along the third axial extent 54 is greater than the circumferential distance between the inboardmost portions of adjacent teeth 44 along the first and/or second axial extents 50, 52.

Referring still to FIGS. 3 and 4, the windings 42 of the stator assembly 12 are positioned within gaps 58 defined between circumferentially adjacent teeth 44 of the stator assembly core 40. The windings 42 are generally bounded in the radially inboard direction by the flared inboardmost portions of the teeth 44. Further, as illustrated in FIG. 3, the windings 42 extend axially beyond the first and second ends 46, 48 of the stator assembly core 40, in various embodiments.

Figure 5:
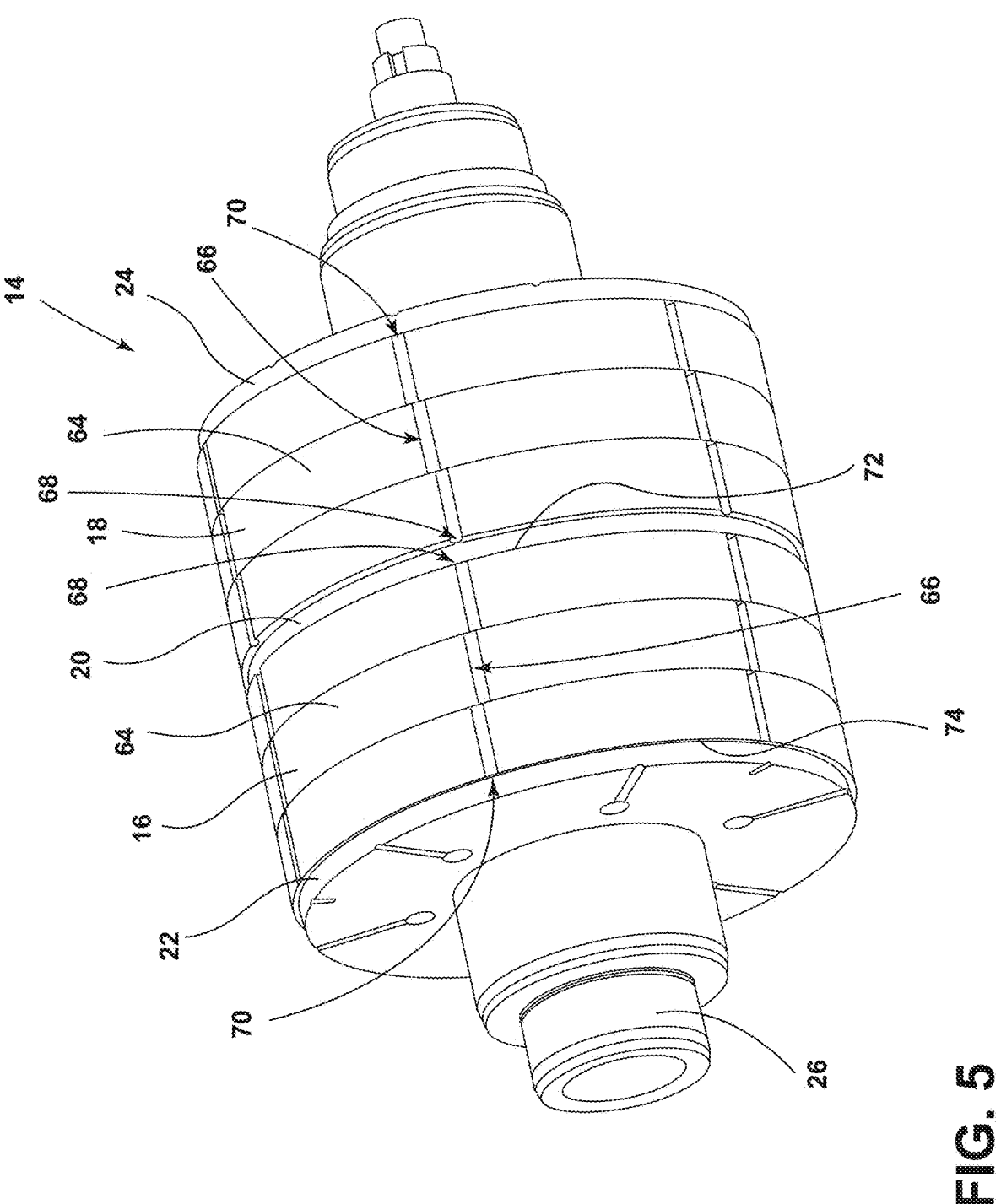
FIG. 5 is a top perspective view of a rotor assembly of a drive unit.
Figure 6:
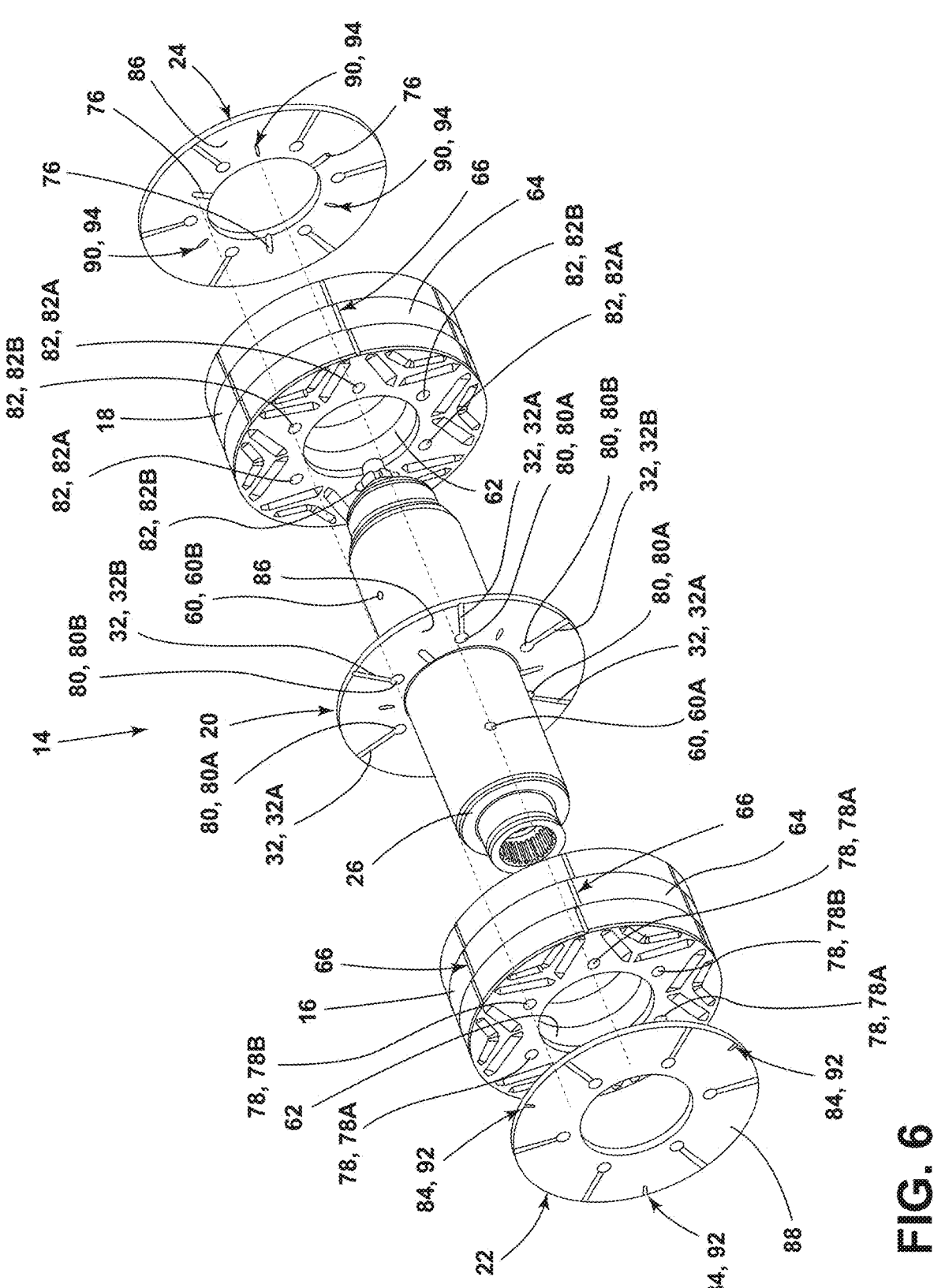
FIG. 6 is an exploded top perspective view of a rotor assembly of a drive unit.

Referring now to FIGS. 3, 5, and 6, the drive unit 10 includes the rotor assembly 14. The rotor assembly 14 includes the first rotor body 16 and the second rotor body 18. The rotor mid plate 20 is positioned axially between the first and second rotor bodies 16, 18. The first rotor end plate 22 is positioned at an axial end of the first rotor body 16, and the second rotor end plate 24 is positioned at an axial end of the second rotor body 18. As illustrated in FIG. 5, the first rotor body 16 is positioned axially between the first rotor end plate 22 and the rotor mid plate 20, and the second rotor body 18 is positioned axially between the second rotor end plate 24 and the rotor mid plate 20. The rotor mid plate 20 may be positioned a first axial distance from the first rotor end plate 22 and a second axial distance from the second rotor end plate 22 that is substantially equal to the first axial distance, as illustrated in FIG. 5. In some embodiments, the rotor mid plate 20 may be positioned an axial distance from the first rotor end plate 22 that is different than the axial distance that the rotor mid plate 20 is from the second rotor end plate 24. Further, it is contemplated that the rotor assembly 14 may include a plurality of rotor mid plates 20, in some embodiments. The first and second rotor bodies 16, 18 are configured to magnetically interact with the magnetic circuit of the stator assembly 12, in some embodiments, during operation of the motor 36 of the drive unit 10.

Referring still to FIGS. 3, 5, and 6, the rotor assembly 14 includes the rotor shaft 26. As illustrated in FIG. 3, the rotor shaft 26 defines the interior hollow 30. The rotor shaft 26 may define a rotor shaft port 60. In some implementations, the rotor shaft 26 can define a plurality of rotor shaft ports 60, as illustrated in FIG. 3. The plurality of rotor shaft ports 60 may include a first sub-plurality of rotor shaft ports 60A and a second sub-plurality of rotor shaft ports 60B, as described further herein. The rotor shaft port 60 defined by the rotor shaft 26 extends from the interior hollow 30 defined by the rotor shaft 26 to an exterior environment of the rotor shaft 26 that may form a portion of the fluid flow path 28 of the drive unit 10.

As illustrated in FIG. 5, the first and second rotor bodies 16, 18, the first and second rotor end plates 22, 24, and the rotor mid plate 20 are disposed about the rotor shaft 26 of the rotor assembly 14. The first and second rotor bodies 16, 18 each include an inner surface 62 and an outer surface 64. The inner surfaces 62 of the first and second rotor bodies 16, 18 face the rotor shaft 26 and the outer surfaces 64 of the first and second rotor bodies 16, 18 are positioned opposite the respective inner surfaces 62. As illustrated in FIG. 5, the outer surface 64 of the first rotor body 16 defines a channel 66. The channel 66 extends axially from a first channel end 68 to a second channel end 70. As illustrated in FIG. 5, the first channel end 68 is proximate to the rotor mid plate 20 of the rotor assembly 14 and the second channel end 70 is proximate to the first rotor end plate 22 of the rotor assembly 14. As illustrated in FIG. 6, the channel 66 defined by the outer surface 64 of the first rotor body 16 extends axially from a first axial edge 72 of the first rotor body 16 that is adjacent to the rotor mid plate 20 to a second axial edge 74 of the first rotor body 16 that is adjacent to the first rotor end plate 22. In various implementations, the first channel end 68 is circumferentially offset from the second channel end 70.

In operation of the drive unit 10, the first and second channel ends 68, 70 being circumferentially offset relative to each other may cause fluid disposed within the channel 66 to be conveyed within the channel 66 away from the first channel end 68. In various embodiments, the fluid is conveyed within the channel 66 away from the first channel end 68 and out of the second channel end 70, such that the fluid is dispersed away from the rotor mid plate 20 of the rotor assembly 14. As illustrated in FIG. 5, the second rotor body 18 can include the channel 66 that extends axially along the outer surface 64 of the second rotor body 18. Further, the first and second channel ends 68, 70 of the channel 66 defined by the second rotor body 18 may be circumferentially offset from each other.

Referring now to FIGS. 3 and 5-8, the drive unit 10 includes the fluid flow path 28 along which fluid is conveyed in operation of the drive unit 10. The rotor assembly 14 of the drive unit 10 defines a portion of the fluid flow path 28 of the drive unit 10. In various embodiments, the portion of the fluid flow path 28 that is defined by the rotor assembly 14 includes the interior hollow 30 defined by the rotor shaft 26 and the fluid passage 32 that is defined by the rotor mid plate 20. In operation of the drive unit 10, fluid may be conveyed along the portion of the fluid flow path 28 defined by the rotor assembly 14 from the interior hollow 30 defined by the rotor shaft 26 to the fluid passage 32 defined by the rotor mid plate 20 and radially outboard therefrom to a portion of the stator assembly 12 that is positioned axially between the first and second rotor end plates 22, 24. In various implementations, fluid is conveyed along the portion of the fluid flow path 28 defined by the rotor assembly 14 from the interior hollow 30 to the fluid passage 32 and radially outboard therefrom to the third axial extent 54 of the plurality of teeth 44 of the stator assembly core 40. For example, as illustrated in FIG. 3, the fluid is conveyed to the third axial extent 54 of the plurality of teeth 44 of the stator assembly core 40 and to the windings 42 of the stator assembly 12 that are disposed within the gaps 58 defined by the plurality of teeth 44 of the stator assembly core 40.

In some implementations, in operation of the drive unit 10, fluid is sequentially conveyed along the portion of the fluid flow path 28 that is defined by the rotor assembly 14 from the interior hollow 30 defined by the rotor shaft 26 to the first rotor end plate 22, from the first rotor end plate 22 to the first rotor body 16, from the first rotor body 16 to the fluid passage 32 of the rotor mid plate 20, and radially outboard therefrom to a portion of the stator assembly 12 that is positioned axially between the first and second rotor end plates 22, 24, such as the third axial extent 54 of the plurality of teeth 44 of the stator assembly core 40.

In an exemplary embodiment of the drive unit 10, the first rotor end plate 22 defines a fluid inlet channel 76 that is aligned with a rotor shaft port 60 defined by the rotor shaft 26, the first rotor body 16 defines a first rotor body fluid passage 78 that is aligned with the fluid inlet channel 76 and that extends axially through the first rotor body 16 to the rotor mid plate 20, and the rotor mid plate 20 defines an aperture 80 and the rotor mid plate fluid passage 32 that is in fluid communication with the aperture 80 and extends radially outboard therefrom. In operation of the exemplary embodiment of the drive unit 10, as the rotor assembly 14 rotates, fluid within the interior hollow 30 defined by the rotor shaft 26 is conveyed through the rotor shaft port 60 into the fluid inlet channel 76, from the fluid inlet channel 76 into the first rotor body fluid passage 78 toward the rotor mid plate 20, from the first rotor body fluid passage 78 to the aperture 80, along the rotor mid plate fluid passage 32 from the aperture 80, and radially outboard therefrom to the stator assembly 12 of the drive unit 10.

In the exemplary embodiment of the rotor assembly 14 of the drive unit 10 illustrated in FIGS. 3 and 5-8, various portions of the rotor assembly 14 define the portion of the fluid flow path 28 that is defined by the rotor assembly 14. The first rotor body 16 defines a plurality of first rotor body fluid passages 78 that extend axially through the first rotor body 16. The plurality of first rotor body fluid passages 78 includes a first sub-plurality of first rotor body fluid passages 78A and a second sub-plurality of first rotor body fluid passages 78B. As illustrated in FIG. 6, the first and second sub-pluralities of first rotor body fluid passages 78A, 78B are arranged in a circumferentially alternating fashion.

The second rotor body 18 defines a plurality of second rotor body fluid passages 82 that extend axially through the second rotor body 18. The plurality of second rotor body fluid passages 82 includes a first sub-plurality of second rotor body fluid passages 82A and a second sub-plurality of second rotor body fluid passages 82B. As illustrated in FIG. 6, the first and second sub-pluralities of second rotor body fluid passages 82A, 82B are arranged in a circumferentially alternating fashion.

Referring still to the exemplary embodiment of the rotor assembly 14 illustrated in FIGS. 3 and 5-8, the rotor mid plate 20 positioned axially between the first and second rotor bodies 16, 18 defines a plurality of apertures 80. The plurality of apertures 80 includes a first sub-plurality of apertures 80A and a second sub-plurality of apertures 80B. As illustrated in FIG. 6, the first and second sub-pluralities of apertures 80A, 80B defined by the rotor mid plate 20 are arranged in a circumferentially alternating fashion. As further illustrated in FIG. 6, the first sub-pluralities of first rotor body fluid passages 78A, second rotor body fluid passages 82A, and apertures 80A are circumferentially aligned and in fluid communication with each other. Further, the second sub-pluralities of first rotor body fluid passages 78B, second rotor body fluid passages 82B, and apertures 80B are circumferentially aligned and in fluid communication with each other.

The rotor mid plate 20 further defines a plurality of rotor mid plate fluid passages 32 that are in communication with the plurality of apertures 80 defined by the rotor mid plate 20 and that extend radially outboard therefrom. As illustrated in FIG. 6, the plurality of rotor mid plate fluid passages 32 includes a first sub-plurality of rotor mid plate fluid passages 32A that are in fluid communication with the first sub-plurality of apertures 80A and a second sub-plurality of rotor mid plate fluid passages 32B that are in fluid communication with the second sub-plurality of apertures 80B.

The rotor shaft 26 defines the interior hollow 30 and the plurality of rotor shaft ports 60 that extend through the rotor shaft 26, such that the interior hollow 30 and an exterior environment of the rotor shaft 26 are in fluid communication via the plurality of rotor shaft ports 60. The plurality of rotor shaft ports 60 includes a first sub-plurality of rotor shaft ports 60A and a second sub-plurality of rotor shaft ports 60B. The first sub-plurality of rotor shaft ports 60A is in an axially spaced relationship with the second sub-plurality of rotor shaft ports 60B. As illustrated in FIG. 3, the first sub-plurality of rotor shaft ports 60A is axially aligned with the first rotor end plate 22, and the second sub-plurality of rotor shaft ports 60B is axially aligned with the second rotor end plate 22.

The first rotor end plate 22 defines a plurality of fluid inlet channels 76 that initiate at the radially inboardmost edge of the first rotor end plate 22 and extend radially outboard therefrom, such that the plurality of fluid inlet channels 76 extend between and are in fluid communication with the first sub-plurality of rotor shaft ports 60A and the first sub-plurality of first rotor body fluid passages 78A. The first rotor end plate 22 further defines a plurality of first rotor end plate fluid outlet ports 84 that are aligned with and in fluid communication with the second sub-plurality of first rotor body fluid passages 78B. Each of the first rotor end plate fluid outlet ports 84 extends through the first rotor end plate 22 from a first axial side 86 of the first rotor end plate 22 to a second axial side 88 of the first rotor end plate 22 axially and radially outboard from an inlet 90 of the first rotor end plate fluid outlet port 84 to an outlet 92 of the first rotor end plate fluid outlet port 84 (see FIGS. 7 and 8).

The second rotor end plate 24 defines a plurality of fluid inlet channels 76 that initiate at the radially inboardmost edge of the second rotor end plate 24 and extend radially outboard therefrom, such that the plurality of fluid inlet channels 76 of the second rotor end plate 24 extend between and are in fluid communication with the second sub-plurality of rotor shaft ports 60B and the second sub-plurality of second rotor body fluid passages 82B. The second rotor end plate 24 further defines a plurality of second rotor end plate fluid outlet ports 94 that are aligned with and in fluid communication with the first sub-plurality of second rotor body fluid passages 82A. Each of the second rotor end plate fluid outlet ports 94 extends through the second rotor end plate 24 from the first axial side 86 of the second rotor end plate 24 to the second axial side 88 of the second rotor end plate 24 axially and radially outboard from the inlet 90 of the second rotor end plate fluid outlet port 94 to the outlet 92 of the second rotor end plate fluid outlet port 94 (see FIGS. 7 and 8).

In operation of the exemplary embodiment of the drive unit 10 illustrated in FIGS. 3 and 5-8, the rotor assembly 14 rotates relative to the stator assembly 12. Rotation of the rotor assembly 14 causes fluid within the interior hollow 30 defined by the rotor shaft 26 to be conveyed through the first sub-plurality of rotor shaft ports 60A and through the second sub-plurality of rotor shaft ports 60B. The fluid conveyed into the first sub-plurality of rotor shaft ports 60A flows into the plurality of fluid inlet channels 76 defined by the first rotor end plate 22. The fluid then flows into the first sub-plurality of first rotor body fluid passages 78A and onward to the first sub-plurality of apertures 80A defined by the rotor mid plate 20. Upon flowing to the first sub-plurality of apertures 80A defined by the rotor mid plate 20, some of the fluid is conveyed radially outboard along the first sub-plurality of rotor mid plate fluid passages 32A defined by rotor mid plate 20 and onto a portion of the stator assembly 12 positioned between the first and second rotor end plates 22, 24. The remainder of the fluid that flows to the first sub-plurality of apertures 80A flows through the first sub-plurality of apertures 80A and into the first sub-plurality of second rotor body fluid passages 82A. The fluid flows along the first sub-plurality of second rotor body fluid passages 82A to the plurality of second rotor end plate fluid outlet ports 94. The fluid enters the inlets 90 of the second rotor end plate fluid outlet ports 94 from the first sub-plurality of second rotor body fluid passages 82A and then flows out of the outlets 92 of the second rotor end plate fluid outlet ports 94 and onto the stator assembly windings 42. As illustrated in FIG. 3, the fluid is conveyed onto a portion of the windings 42 that extends axially beyond the second end 48 of the stator assembly core 40.

The fluid conveyed into the second sub-plurality of rotor shaft ports 60B flows into the plurality of fluid inlet channels 76 defined by the second rotor end plate 24. The fluid then flows into the second sub-plurality of second rotor body fluid passages 82B and onward to the second sub-plurality of apertures 80B defined by the rotor mid plate 20. Upon flowing to the second sub-plurality of apertures 80B defined by the rotor mid plate 20, some of the fluid is conveyed radially outboard along the second sub-plurality of rotor mid plate fluid passages 32B defined by the rotor mid plate 20 and onto a portion of the stator assembly 12 positioned between the first and second rotor end plates 22, 24, such as the third axial extent 54 of the plurality of teeth 44. The remainder of the fluid that flows to the second sub-plurality of apertures 80B flows through the second sub-plurality of apertures 80B and into the second sub-plurality of first rotor body fluid passages 78B. The fluid flows along the second sub-plurality of first rotor body fluid passages 78B to the plurality of first rotor end plate fluid outlet ports 84. The fluid enters the inlets 90 of the first rotor end plate fluid outlet ports 84 from the second sub-plurality of first rotor body fluid passages 78B and then flows out of the outlets 92 of the first rotor end plate fluid outlet ports 84 and onto the stator assembly windings 42. As illustrated in FIG. 3, the fluid is conveyed onto a portion of the windings 42 that extends axially beyond the first end 46 of the stator assembly core 40.

Figures 7, 8:
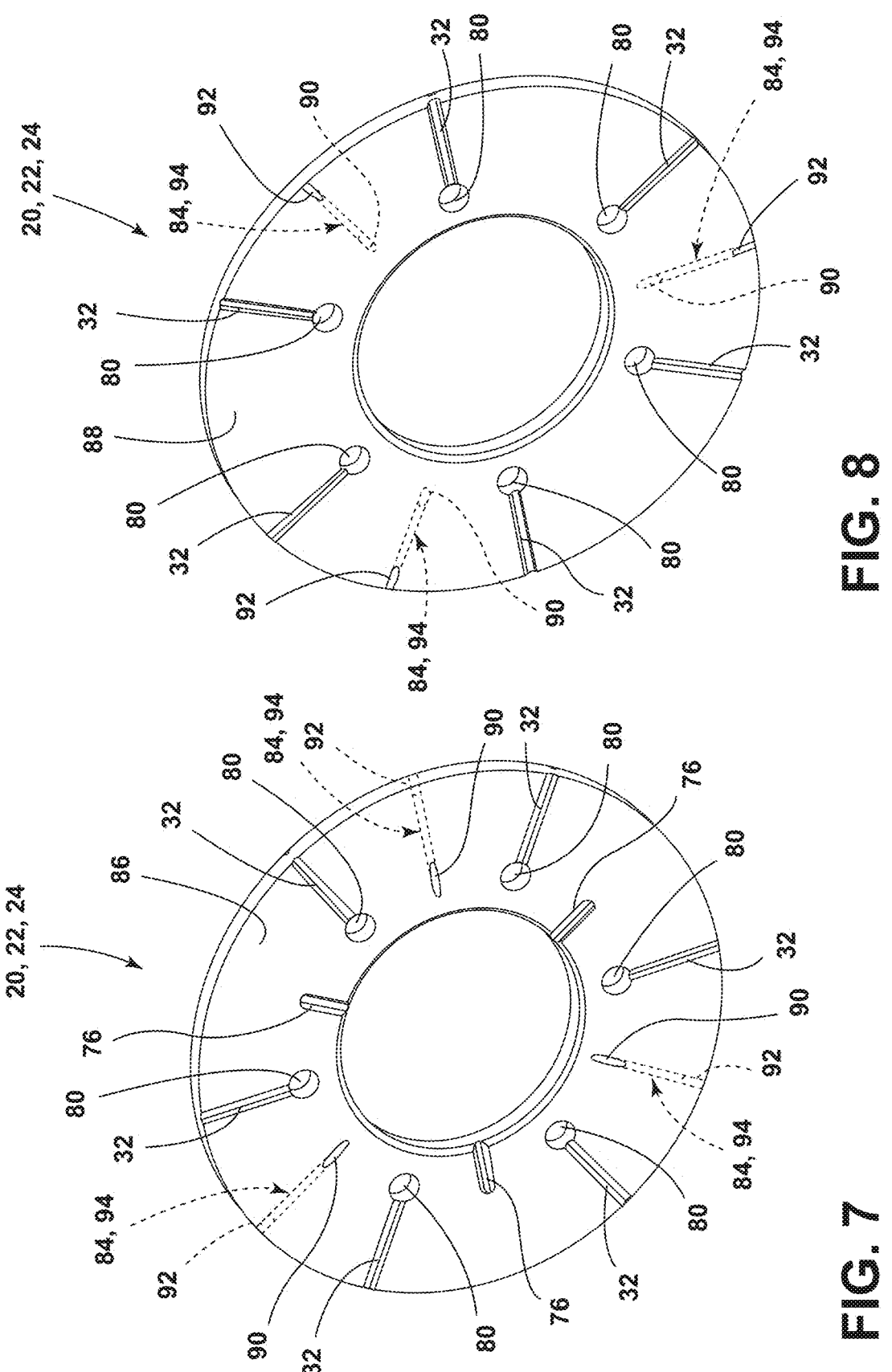
FIG. 7 is a perspective view of a rotor plate of the rotor assembly that illustrates a first axial side of the rotor plate.
FIG. 8 is a side perspective view of the rotor plate of the rotor assembly that illustrates a second axial side of the rotor plate that is opposite the first axial side.

Referring now to FIGS. 6-8, in some embodiments, the first rotor end plate 22, the second rotor end plate 24, and/or the rotor mid plate 20 may be substantially identical in shape. For example, as illustrated in FIG. 6, each of the first rotor end plate 22, the second rotor end plate 24, and the rotor mid plate 20 is substantially identical in shape, having six apertures, six fluid passages that extend radially outward from the six apertures, three fluid inlet channels, and three fluid outlet ports. In the embodiment illustrated in FIG. 6, the substantially identically shaped first rotor end plate 22, second rotor end plate 24, and rotor mid plate 20 have differing orientations relative to each other in the rotor assembly 14. As illustrated, the first rotor end plate 22 faces a first direction, while the second rotor end plate 24 and the rotor mid plate 20 face a second direction that is opposite the first direction. Further, the second rotor end plate 24 and the rotor mid plate 20 are circumferentially offset relative to each other.

The drive unit 10 of the present disclosure may provide a variety of advantages. First, the rotor assembly 14 defining a portion of the fluid flow path 28 of the drive unit 10 that results in fluid being conveyed to a portion of the stator assembly 12 that is disposed axially between the first and second rotor end plates 22, 24 may advantageously allow for cooling of that portion of the stator assembly 12. Second, the plurality of teeth 44 of the stator assembly core 40 having the third axial extent 54, as described above, may allow for fluid to more readily contact the stator assembly windings 42 proximate to the third axial extent 54, such that efficient cooling is achieved. Third, the first rotor end plate 22, the second rotor end plate 24, and the rotor mid plate 20 being substantially identical in shape may allow for efficient and cost-effective manufacturing of the components of the rotor assembly 14.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 drive unit
12 stator assembly
14 rotor assembly
16 first rotor body
18 second rotor body
20 rotor mid plate
22 first rotor end plate
24 second rotor end plate
26 rotor shaft
28 fluid flow path
30 interior hollow
32 rotor mid plate fluid passage
32A first sub-plurality
32B second sub-plurality
34 housing
36 motor
38 axis
40 stator assembly core
42 windings
44 teeth
46 first end of stator assembly core
48 second end of stator assembly core
50 first axial extent
52 second axial extent
54 third axial extent
56 terminal ends
58 gaps
60 rotor shaft port
60A first sub-plurality
60B second sub-plurality
62 inner surface
64 outer surface
66 channel
68 first channel end
70 second channel end
72 first axial edge
74 second axial edge
76 fluid inlet channel
78 first rotor body fluid passage
78A first sub-plurality
78B second sub-plurality
80 aperture
80A first sub-plurality
80B second sub-plurality
82 second rotor body fluid passage
82A first sub-plurality
82B second sub-plurality
84 first rotor end plate fluid outlet ports
86 first axial side
88 second axial side
90 inlet
92 outlet
94 second rotor end plate fluid outlet ports

What is claimed is:

1. A drive unit, comprising:
a stator assembly comprising:
    a stator assembly core having a plurality of teeth that extend axially from a first end of the stator assembly core to a second end of the stator assembly core opposite the first end, the plurality of teeth having a first axial extent that extends toward the second end from the first end, a second axial extent that extends toward the first end from the second end, and a third axial extent that is positioned axially between the first and second axial extents, wherein the radially inboardmost portions of the first and second axial extents of the plurality of teeth are positioned radially inboard of the radially inboardmost portions of the third axial extent of the plurality of teeth; and a rotor assembly positioned radially inboard of the stator assembly, and comprising:

a first rotor body;

a second rotor body;

a rotor mid plate positioned axially between the first and second rotor bodies and axially aligned with the third axial extent of the plurality of teeth;

a first rotor end plate positioned at an axial end of the first rotor body, such that the first rotor body is positioned axially between the first rotor end plate and the rotor mid plate;

a second rotor end plate positioned at an axial end of the second rotor body, such that the second rotor body is positioned axially between the second rotor end plate and the rotor mid plate; and a rotor shaft positioned radially inboard of the first and second rotor bodies, wherein the rotor assembly defines a portion of a fluid flow path of the drive unit, and the portion of the fluid flow path includes an interior hollow defined by the rotor shaft and a fluid passage defined by the rotor mid plate, and wherein, in operation of the drive unit, fluid is conveyed along the portion of the fluid flow path from the interior hollow to the fluid passage and radially outboard therefrom to the third axial extent of the plurality of teeth of the stator assembly core, wherein the first rotor body includes an inner surface that faces the rotor shaft and an outer surface that is opposite the inner surface and that defines a channel that extends axially from a first channel end that is proximate to the rotor mid plate to a second channel end that is proximate to the first rotor end plate and circumferentially offset from the first channel end.

2. The drive unit of claim 1, wherein the plurality of teeth flare outward proximate to the radially inboardmost portions of the teeth along the first and second axial extents more so than along the third axial extent, such that the plurality of teeth are T-shaped along the first and second axial extents.

3. The drive unit of claim 1, wherein the rotor mid plate is substantially identical in shape to the first rotor end plate and the second rotor end plate.

4. The drive unit of claim 1, wherein, in operation of the drive unit, fluid is sequentially conveyed along the portion of the fluid flow path from the interior hollow to the first rotor end plate, to the first rotor body, to the fluid passage of the rotor mid plate, and radially outboard therefrom to the third axial extent of the plurality of teeth of the stator assembly core.

5. The drive unit of claim 4, wherein the rotor shaft defines a rotor shaft port, and the first rotor end plate defines a fluid inlet channel that is aligned with the rotor shaft port, and wherein, in operation of the drive unit, fluid is conveyed out of the interior hollow defined by the rotor shaft, through the rotor shaft port, and into the fluid inlet channel.

6. The drive unit of claim 5, wherein the first rotor body defines a first rotor body fluid passage that is aligned with the fluid inlet channel and that extends axially through the first rotor body to the rotor mid plate, and wherein, in operation of the drive unit, fluid is conveyed from the fluid inlet channel into the first rotor body fluid passage toward the rotor mid plate.

7. The drive unit of claim 6, wherein the rotor mid plate defines an aperture that is in fluid communication with the fluid passage defined by the rotor mid plate, and wherein, in operation of the drive unit, fluid is conveyed from the first rotor body fluid passage to the aperture, along the fluid passage defined by the rotor mid plate, and radially outboard therefrom to the stator assembly.

8. A drive unit, comprising:

a stator assembly; and a rotor assembly positioned radially inboard of the stator assembly, and comprising:

a first rotor body;

a second rotor body;

a rotor mid plate positioned axially between the first and second rotor bodies;

a first rotor end plate positioned at an axial end of the first rotor body, such that the first rotor body is positioned axially between the first rotor end plate and the rotor mid plate;

a second rotor end plate positioned at an axial end of the second rotor body, such that the second rotor body is positioned axially between the second rotor end plate and the rotor mid plate; and a rotor shaft positioned radially inboard of the first and second rotor bodies, wherein the rotor assembly defines a portion of a fluid flow path of the drive unit, and the portion of the fluid flow path includes an interior hollow defined by the rotor shaft and a fluid passage defined by the rotor mid plate, and wherein, in operation of the drive unit, fluid is conveyed along the portion of the fluid flow path from the interior hollow to the fluid passage and radially outboard therefrom to a portion of the stator assembly positioned axially between the first and second rotor end plates, wherein the rotor mid plate is substantially identical in shape to the first rotor end plate and the second rotor end plate.

9. The drive unit of claim 8, wherein the rotor mid plate is positioned a first axial distance from the first rotor end plate and a second axial distance from the second rotor end plate that is substantially equal to the first axial distance.

10. The drive unit of claim 8, wherein the stator assembly comprises:

a stator assembly core having a plurality of teeth that extend axially from a first end of the stator assembly core to a second end of the stator assembly core opposite the first end, the plurality of teeth having a first axial extent that extends toward the second end from the first end, a second axial extent that extends toward the first end from the second end, and a third axial extent that is positioned axially between the first and second axial extents, wherein the radially inboardmost portions of the first and second axial extents of the plurality of teeth are positioned radially inboard of the radially inboardmost portions of the third axial extent of the plurality of teeth, and wherein the third axial extent is axially aligned with the rotor mid plate of the rotor assembly.

11. The drive unit of claim 10, wherein the plurality of teeth flare outward proximate to the inboardmost portions of the teeth along the first and second axial extents more so than along the third axial extent, such that the plurality of teeth are T-shaped along the first and second axial extents.

12. The drive unit of claim 8, wherein, in operation of the drive unit, fluid is sequentially conveyed along the portion of the fluid flow path from the interior hollow, to the first rotor end plate, to the first rotor body, to the fluid passage of the rotor mid plate, and radially outboard therefrom to the portion of the stator assembly positioned axially between the first and second rotor end plates.

13. The drive unit of claim 12, wherein the rotor shaft defines a rotor shaft port, and the first rotor end plate defines a fluid inlet channel that is aligned with the rotor shaft port, and wherein, in operation of the drive unit, fluid is conveyed out of the interior hollow defined by the rotor shaft, through the rotor shaft port, and into the fluid inlet channel.

14. The drive unit of claim 13, wherein the first rotor body defines a first rotor body fluid passage that is aligned with the fluid inlet channel and that extends axially through the first rotor body to the rotor mid plate, and wherein, in operation of the drive unit, fluid is conveyed from the fluid inlet channel into the first rotor body fluid passage toward the rotor mid plate.

15. The drive unit of claim 14, wherein the rotor mid plate defines an aperture that is in fluid communication with the fluid passage defined by the rotor mid plate, and wherein, in operation of the drive unit, fluid is conveyed from the first rotor body fluid passage to the aperture, along the fluid passage defined by the rotor mid plate, and radially outboard therefrom to the stator assembly.

16. A drive unit, comprising:
a stator assembly; and
a rotor assembly positioned radially inboard of the stator assembly, and comprising:
  a first rotor body;
  a second rotor body;
  a rotor mid plate positioned axially between the first and second rotor bodies;
  a first rotor end plate positioned at an axial end of the first rotor body, such that the first rotor body is positioned axially between the first rotor end plate and the rotor mid plate;
  a second rotor end plate positioned at an axial end of the second rotor body, such that the second rotor body is positioned axially between the second rotor end plate and the rotor mid plate; and
a rotor shaft positioned radially inboard of the first and second rotor bodies, wherein the rotor assembly defines a portion of a fluid flow path of the drive unit, and the portion of the fluid flow path includes an interior hollow defined by the rotor shaft and a fluid passage defined by the rotor mid plate, and wherein, in operation of the drive unit, fluid is conveyed along the portion of the fluid flow path from the interior hollow to the fluid passage and radially outboard therefrom to a portion of the stator assembly positioned axially between the first and second rotor end plates, wherein, in operation of the drive unit, fluid is sequentially conveyed along the portion of the fluid flow path from the interior hollow, to the first rotor end plate, to the first rotor body, to the fluid passage of the rotor mid plate, and radially outboard therefrom to the portion of the stator assembly positioned axially between the first and second rotor end plates, wherein the rotor shaft defines a rotor shaft port, and the first rotor end plate defines a fluid inlet channel that is aligned with the rotor shaft port, and wherein, in operation of the drive unit, fluid is conveyed out of the interior hollow defined by the rotor shaft, through the rotor shaft port, and into the fluid inlet channel, and wherein the first rotor body defines a first rotor body fluid passage that is aligned with the fluid inlet channel and that extends axially through the first rotor body to the rotor mid plate, and wherein, in operation of the drive unit, fluid is conveyed from the fluid inlet channel into the first rotor body fluid passage toward the rotor mid plate.

17. The drive unit of claim 16, wherein the rotor mid plate defines an aperture that is in fluid communication with the fluid passage defined by the rotor mid plate, and wherein, in operation of the drive unit, fluid is conveyed from the first rotor body fluid passage to the aperture, along the fluid passage defined by the rotor mid plate, and radially outboard therefrom to the stator assembly.

* * * * *